(12) United States Patent
Salditch et al.

(10) Patent No.: US 7,861,846 B1
(45) Date of Patent: Jan. 4, 2011

(54) SINGULATING APPARATUS

(75) Inventors: Ian Eric Salditch, Hunt Valley, MD (US); George H. Selph, Jr., Bensalem, PA (US)

(73) Assignee: Multi-Comp, Inc., Hunt Valley, MD (US)

( * ) Notice: Subject to any disclaimer, the term of this patent is extended or adjusted under 35 U.S.C. 154(b) by 42 days.

(21) Appl. No.: 12/535,970

(22) Filed: Aug. 5, 2009

(51) Int. Cl.
*B65G 47/24* (2006.01)

(52) U.S. Cl. .................. 198/392; 198/397.02; 221/169

(58) Field of Classification Search .................. 198/392, 198/397.01, 397.02, 397.04, 397.05; 221/167, 221/169, 172, 252, 265, 277
See application file for complete search history.

(56) References Cited

U.S. PATENT DOCUMENTS

| | | | |
|---|---|---|---|
| 3,722,740 A | * | 3/1973 | List .......................... 221/169 |
| 3,900,107 A | | 8/1975 | Hoppmann |
| 3,986,636 A | * | 10/1976 | Hoppmann et al. ......... 198/392 |
| 5,299,675 A | * | 4/1994 | Schumann et al. .......... 198/392 |
| 5,765,606 A | | 6/1998 | Takemasa et al. |
| 5,826,696 A | * | 10/1998 | Rupp et al. .................. 198/392 |
| 5,984,079 A | * | 11/1999 | Garcia .................... 198/397.02 |
| 7,412,302 B2 | | 8/2008 | Cobb et al. |
| 7,516,836 B2 | | 4/2009 | Trygar et al. |
| 7,571,023 B2 | | 8/2009 | Mitchell et al. |

OTHER PUBLICATIONS

International Search Report and Written Opinion; Application No. PCT/US2010/042873; dated Jul. 22, 2010; 7 pages.

* cited by examiner

*Primary Examiner*—James R Bidwell
(74) *Attorney, Agent, or Firm*—Thomas & Karceski, PC

(57) ABSTRACT

A singulating apparatus is therefore provided that utilizes a plurality of singulating cavities, each singulating cavity having a plurality of movable wall segments enabling the size and shape of the singulating cavities to be changed to correspond to the size and shape of the object being singulated.

15 Claims, 12 Drawing Sheets

SINGULATING APPARATUS

FIELD OF THE INVENTION

The present invention relates generally to apparatus for handling individual product items and articles. More particularly, it relates to apparatus for singulating individual product items, such as medications.

BACKGROUND OF THE INVENTION

Frequently, small product items, and in particular pharmaceuticals such as pills, tablets, capsules, caplets, gelcaps, and lozenges, are packaged in blister packs or cards where each pocket of the package holds a single pill. For ease of reference, any of the above and other small items or objects that may be required to be singulated will be referred to, collectively and generically, as "pills." Blister packs are made by forming a thermoplastic strip formed as an array of upwardly open pockets. A filling machine then puts the desired number of pills (which may be a single pill, more than one pill, or no pill depending on the dosing instructions) into each pocket and a backing to the array of pockets is provided thereby sealing each pill in a pocket separate and apart from other pills within the pack. If more than one pill is to be put into any given pocket, each pill is individually put into the pocket to better control the placement of the pills into the pocket.

In order to make sure that each blister package is marketable, each of the blister pack pockets must contain the desired number of pills or the package is marked as a reject and culled from the product line. The field of pill-dispensing features many different mechanisms that are designed to recognize, sort and count pills of all types and sizes. Many of these devices are unreliable for two basic reasons. Either they fail to singulate pills appropriately and more than the desired number of pills are placed into a single blister pack pocket or they fail to get a pill into the blister pack, leaving the entire pack one pill or more short. Such a failure is expensive when the product itself is expensive or difficult to dispose of, as is the case with many pharmaceuticals. The problem associated with separating pills from each other for individual packaging, or singulation, is exacerbated by the wide variety of different sizes and shapes of different types of pharmaceuticals. If a singulating apparatus has been designed to singulate a particular size and/or shape of pill, such an apparatus may have difficulty singulating pills having different sizes, different shapes, or both. For example, an apparatus that readily singulates capsules may have difficulty singulating tablets. Two tablets may be dispensed, rather than the desired single tablet, because of "shingling" (i.e., two tablets enter the singulating cavity, with one tablet partially on top of another tablet).

BRIEF SUMMARY OF THE INVENTION

A singulating apparatus is therefore provided that utilizes a plurality of singulating cavities, each singulating cavity having a plurality of movable wall segments enabling the size and shape of the singulating cavities to be changed to correspond to the size and shape of the object being singulated.

In one embodiment of the invention, an apparatus for singulating objects comprises a rotating floor, a separator wall, a plurality of singulating cavities, and a plurality of conveying conduits. The separator wall is substantially perpendicular to the rotating floor and adjacent an outer edge of the rotating floor, thereby forming a substantially cylindrical chamber. The separator wall defines a plurality of openings. Each of the plurality of singulating cavities are adjacent an opening in the separator wall. Each singulating cavity is configured for receiving an object that travels from the rotating floor through a corresponding opening in the separator wall. Each singulating cavity comprises a plurality of independently movable wall segments configured for adjustably defining a shape of the singulating cavity. The plurality of wall segments of each singulating cavity is in a stacked configuration and pivot independently about a common axis through a proximal end of each wall segment. The plurality of conveying conduits are configured for conveying an object from a corresponding one of the singulating cavities to a corresponding receiving container.

Each of the plurality of wall segments of each singulating cavity may be configured to independently pivot from a fully open position to a fully closed position, and to any of a plurality of positions between the fully open position and the fully closed position. Each of the plurality of wall segments of each singulating cavity may have a curved face having substantially the same curvature as the separator wall, such that the curved face of each wall segment is substantially aligned with the separator wall when the wall segment is in the fully closed position. The plurality of wall segments of a specific singulating cavity define a desired shape of the singulating cavity by independently pivoting each of the wall segments to a predetermined position that is predetermined based on a size and shape of a type of object to be singulated.

The apparatus may further comprise an aperture control wall that is interiorly concentric with the separator wall and which defines a plurality of openings that each correspond to an opening of the separator wall. Movement of the aperture control wall relative to the separator wall changes an amount of overlap between each opening of the aperture control wall and each corresponding opening of the separator wall, such that the amount of overlap determines an effective opening for an object to travel from the rotating floor into the singulating cavity. The amount of overlap (and therefore the size of the effective opening) is configured based on a size and shape of a type of object to be singulated. The aperture control wall is configured to rotate clockwise and counterclockwise and further configured to move longitudinally in either longitudinal direction, such that the amount of overlap is determined by the amount and direction of rotation and/or the amount and direction of longitudinal movement.

The speed of rotation of the rotating floor may be variable and may be predetermined based on a mass of a type of object to be singulated. The speed of rotation of the rotating floor may be predetermined further based on a coefficient of friction of the type of object to be singulated. The speed of rotation of the rotating floor may be predetermined further based on a coefficient of friction of the surface of the rotating floor.

The rotating floor has a top surface that may be sloped downward from a center of the rotating floor toward the outer edge of the rotating floor.

The apparatus may further comprise a plurality of wall segment positioning rings exteriorly concentric with the separator wall. Each wall segment positioning rings may be configured to separately rotate clockwise or counterclockwise, each one of the wall segment positioning rings cooperating with and thereby controlling a position of corresponding ones of the wall segments of each singulating cavity. The apparatus may further comprise a plurality of connecting rods, each connecting rod connecting a wall segment to a corresponding one of the wall segment positioning rings. Each connecting rod may be pivotally affixed to a corresponding wall segment at a location distal to the proximal end. The apparatus may further comprise a plurality of drive motors, each drive motor configured for rotating a corresponding one of the wall segment positioning rings and thereby moving corresponding ones of the wall segments to the predetermined positions.

The apparatus may further comprise a plurality of gates, each gate corresponding to an opening of the separator wall and configured to alternatively block the corresponding opening of the separator wall or allow access to the corresponding opening of the separator wall. Each of the plurality of gates may be configured to move longitudinally from an open position (thereby allowing access to the corresponding opening of the separator wall) to a closed position (thereby blocking the corresponding opening of the separator wall).

The apparatus may further comprise a blocking ring interiorly concentric with the separator wall and between the separator wall and the rotating floor. The blocking ring may be configured to move longitudinally in either longitudinal direction from an open position to a closed position, such that the blocking ring blocks all openings of the separator wall when in the closed position and allows access to all openings of the separator wall when in the open position.

The apparatus may further comprise a release ring exteriorly concentric with and substantially perpendicular to the separator wall and positioned below the singulating cavities. The release ring defines a plurality of openings, each opening in the release ring corresponding to one of the singulating cavities. The release ring is configured to rotate between an open position and a closed position. When the release ring is in the closed position, the openings in the floor ring do not align with the corresponding singulating cavities, thereby blocking objects in the singulating cavities from dropping out of the singulating cavities. When the release ring is in the open position, the openings in the floor ring align with the corresponding singulating cavities, thereby enabling objects in the singulating cavities drop out of the singulating cavities.

The separator wall may further define a purge opening, and the apparatus may further comprise a purge conduit for conveying objects from the purge opening to a bulk receiving container. One of the plurality of gates may correspond to the purge opening and be configured to alternatively block the purge opening of the separator wall or allow access to the purge opening of the separator wall.

In addition to the apparatus for singulating objects, as described above, other aspects of the present invention are directed to corresponding methods of singulating objects.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
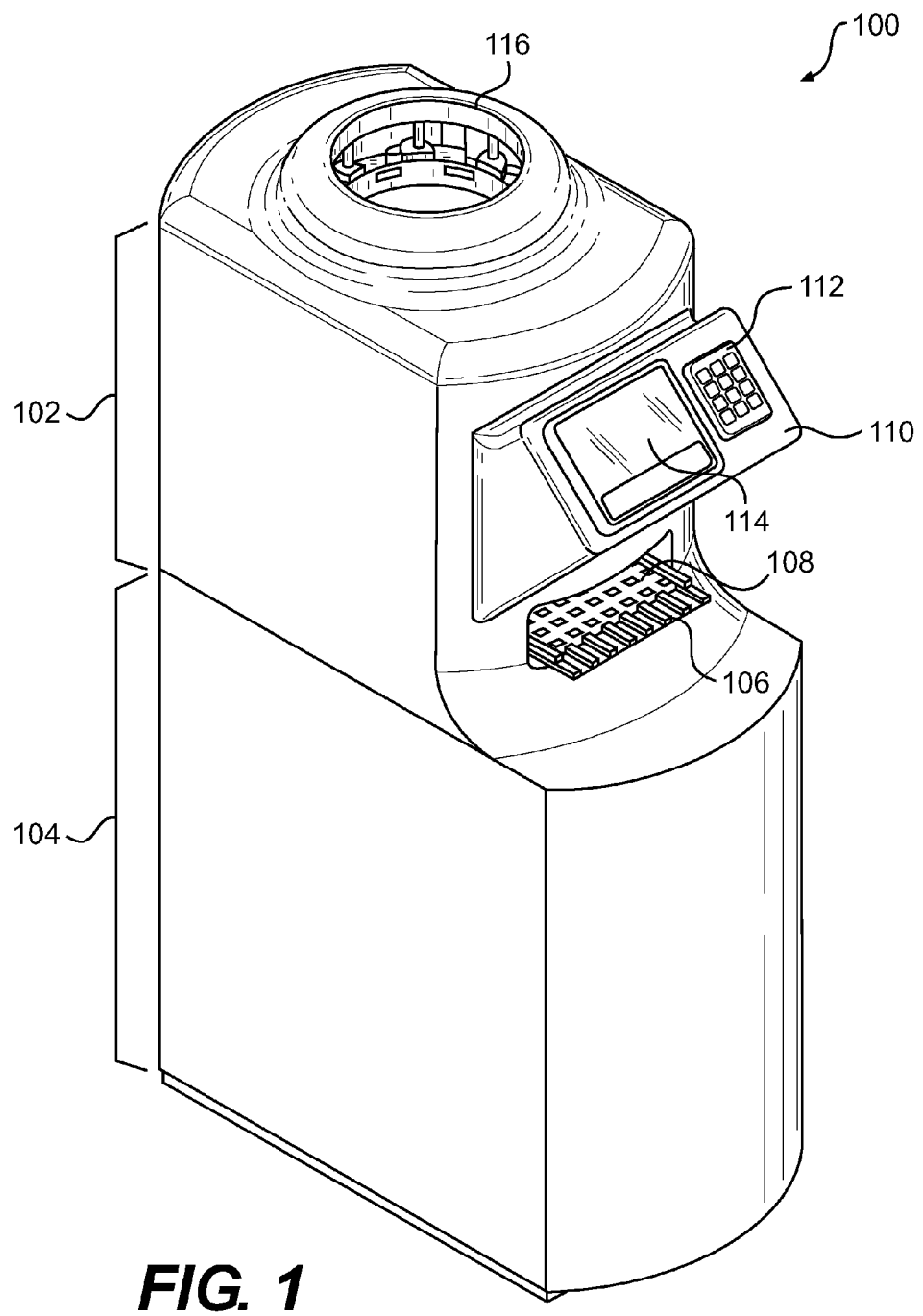
FIG. 1 is a perspective view of a singulating apparatus, in accordance with embodiments of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

A singulating apparatus of embodiments of the invention utilizes a plurality of singulating cavities, each singulating cavity having a plurality of movable wall segments enabling the size and shape of the singulating cavities to be changed to correspond to the size and shape of the object being singulated. While embodiments of the invention are capable of singulating many different types of objects, the structure and function of the invention will be described herein in relation to singulating medications such as pills, tablets, capsules, caplets, gelcaps, and lozenges (which will be referred to, collectively and generically, herein as "pills").

In typical operation, the apparatus of embodiments of the present invention may be used to singulate pills into a blister card such as the blister card disclosed in commonly assigned U.S. Pat. No. 5,791,478, the contents of which are incorporated herein by reference in its entirety. Such a blister card may have, for example, 35 pill receiving cavities (which may be termed blister card recesses) in a 7 by 5 matrix. Commonly, such a blister card is intended to hold some or all of the medications to be taken in a particular month by a particular patient. Each blister recess will typically contain the one or more pills (although some recesses may contain no pills) of each of one or more types of medication (the medications may be prescription or over-the-counter, such as vitamin supplements) that the patient is supposed to take at a particular time on a particular day. In a simple example, patient John Doe may be supposed to take one multivitamin once a day (at any time) and one heart medication pill once a day (at any time). In such a simple example, one blister card may contain the medications to be taken by the patient for an entire month. The singulating apparatus will, in two separate operations, singulate one multivitamin into each of 30 of the card's 35 recesses (assuming a 30 day month) and singulate one heart medication pill into each of 30 of the card's 35 recesses.

In a somewhat more complex example, patient Sally Smith may be supposed to take one anticoagulant once a day in the morning and, in the evening, take one or two (on alternating days) heart medication pills and one acid reducer pill once a day. In this example, a first blister card may contain the medications to be taken in the morning by the patient for an entire month and a second blister card may contain the medications to be taken in the evening by the patient for an entire month. The singulating apparatus will, in three separate operations, (1) singulate one anticoagulant into each of 30 of the first card's 35 recesses (assuming a 30 day month), (2) singulate one or two heart medication pills into alternate ones of each of 30 of the second card's 35 recesses, and (3) singulate one acid reducer into each of 30 of the second card's 35 recesses. It should be appreciated that any particular blister card may have nearly limitless permutations of different types and quantities of medications in different dosing patterns (dosing pattern refers to which individual recesses are to contain a particular medication type and in what quantity). Embodiments of the invention enable singulation of pills in any of these nearly limitless permutations.

Referring now to FIG. 1, a singulating apparatus is illustrated in accordance with embodiments of the present invention. The apparatus 100 comprises an upper housing 102 and a lower housing 104. The upper housing contains a singulating mechanism (the structure and function of the singulating mechanism are described in detail below) and a blister card positioning mechanism 106 (partially visible). The blister card positioning mechanism positions the blister card 108 (partially visible) to receive pills from the singulating mechanism. As seen in FIG. 1, the upper housing includes an opening for a user to place a blister card on the positioning mechanism. In the illustrated arrangement, the singulating mechanism will be configured to be able to fill the blister card one row at a time (that is all recesses in one row at one time) and the positioning mechanism will advance the blister card to the next row after one row is filled. However, embodiments of the invention may be scaled up or down from the illustrated example, such that any desired number of blister card recesses may be filled at one time. For example, the apparatus could have 35 singulating cavities such that all 35 blister card cavities (assuming the blister card has 35 cavities) can be filled in one operation. As discussed above, the blister card could have any number of recesses (e.g., a blister card may have 90 recesses for three-times-a-day dosing over 30 days). Embodiments of the invention can be configured to work with any size blister card, and to fill any size blister card in a single operation. While reference is made herein to filling the recesses of the blister card, it should be appreciated that (as mentioned in the example above) not all recesses will necessarily contain any pills. It should also be appreciated that the singulating mechanism may be used to singulate pills into other types of containers. The top of the upper housing defines an opening 116 to enable a supply of pills to be singulated to be poured into the singulating mechanism. The lower housing will typically contain auxiliary or accessory equipment, such as a compressed air supply and a power supply.

The apparatus 100 also comprises a user interface 110 which may be mounted on the front of the upper housing for easy access by a user. The user interface may vary depending on the requirements and preferences of users, but typically includes a display 114 and a keypad 112. The display may be a touch screen for data entry (either in addition to or instead of the keypad). Optionally, the user interface may include a bar code reader or magnetic card reader. The user interface may include a speaker for providing voice prompts to the user.

Figure 2:
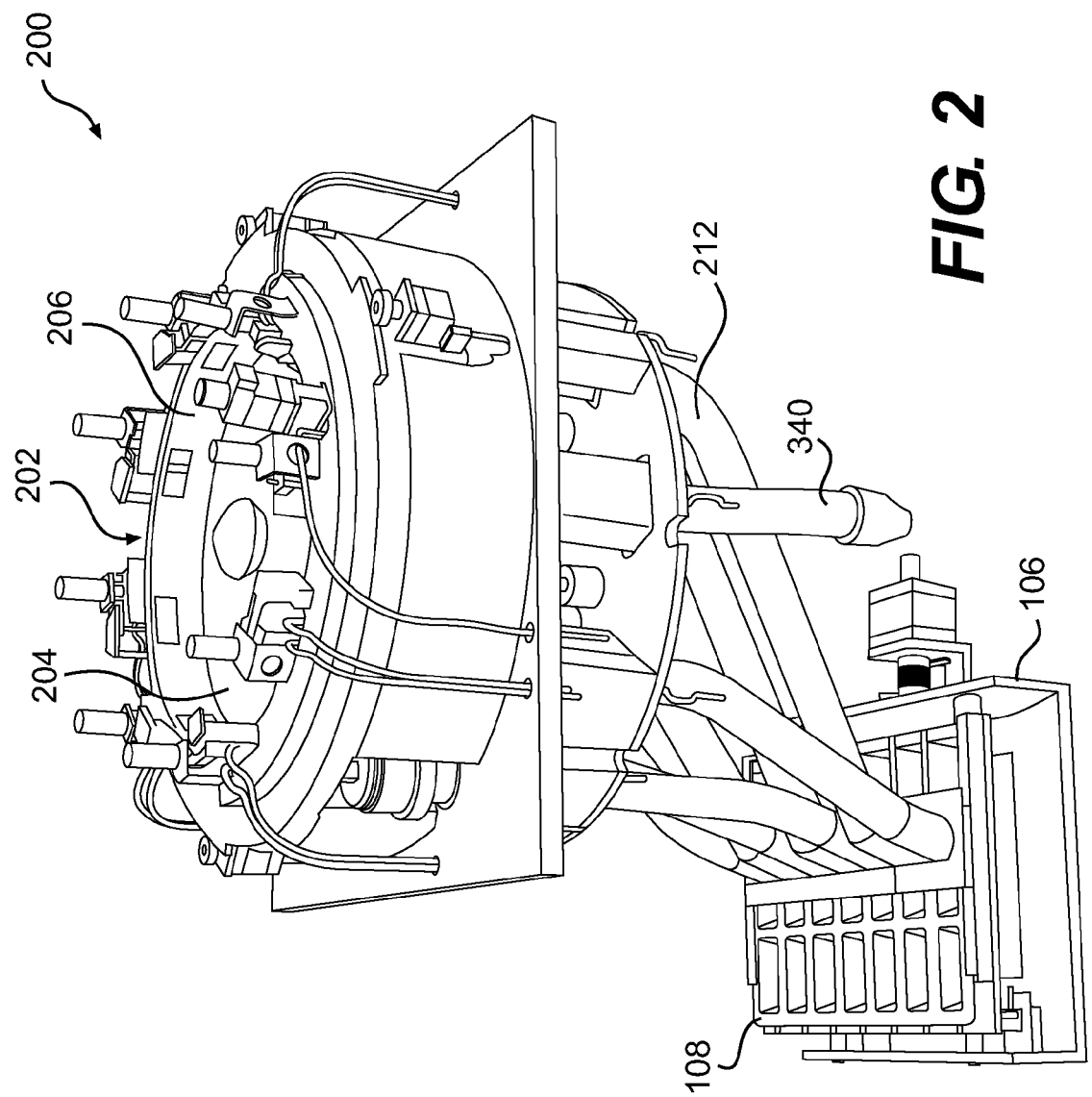
FIG. 2 is a perspective view of a singulating mechanism of the singulating apparatus of FIG. 1.
Figure 3:
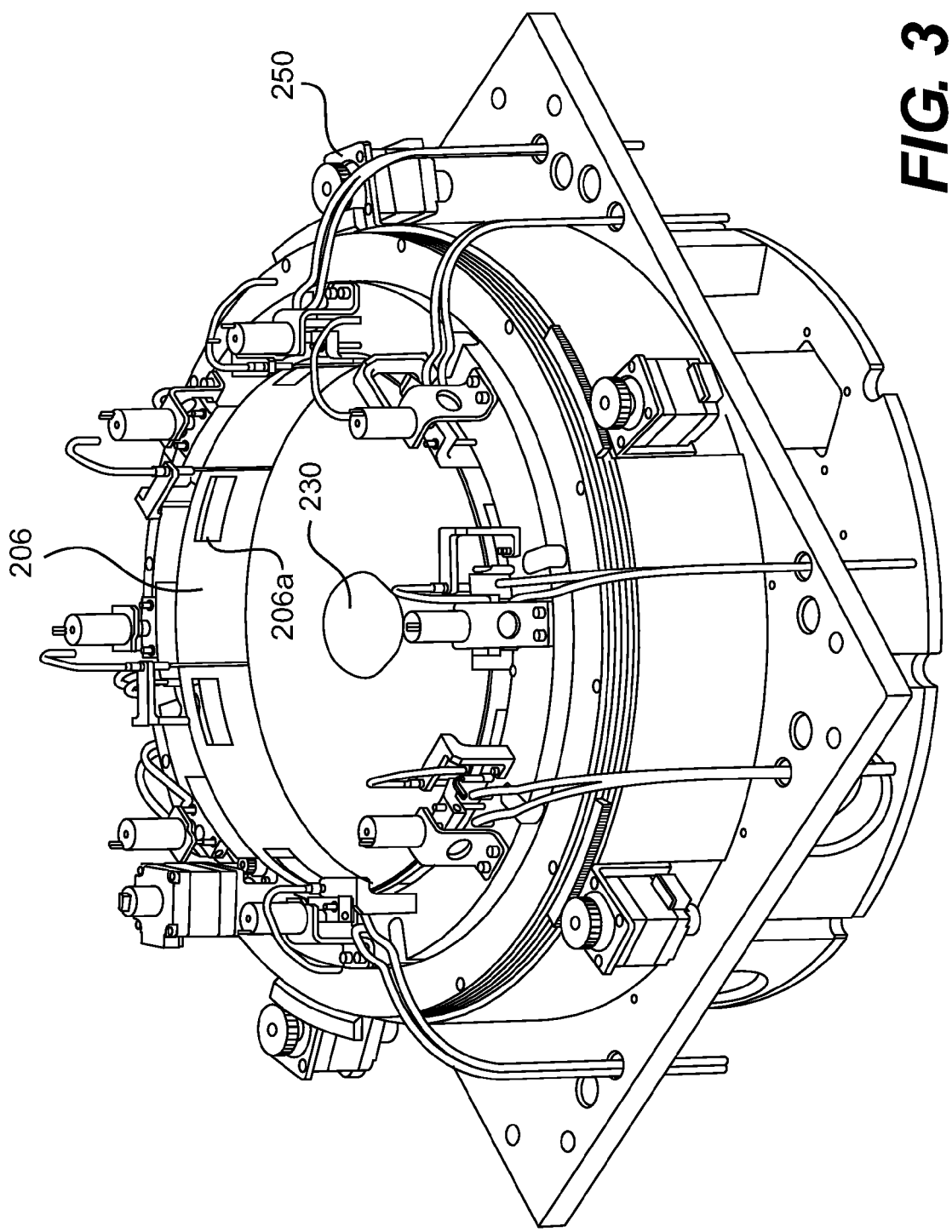
FIG. 3 is a perspective view of a portion of the singulating mechanism of FIG. 2.
Figure 4:
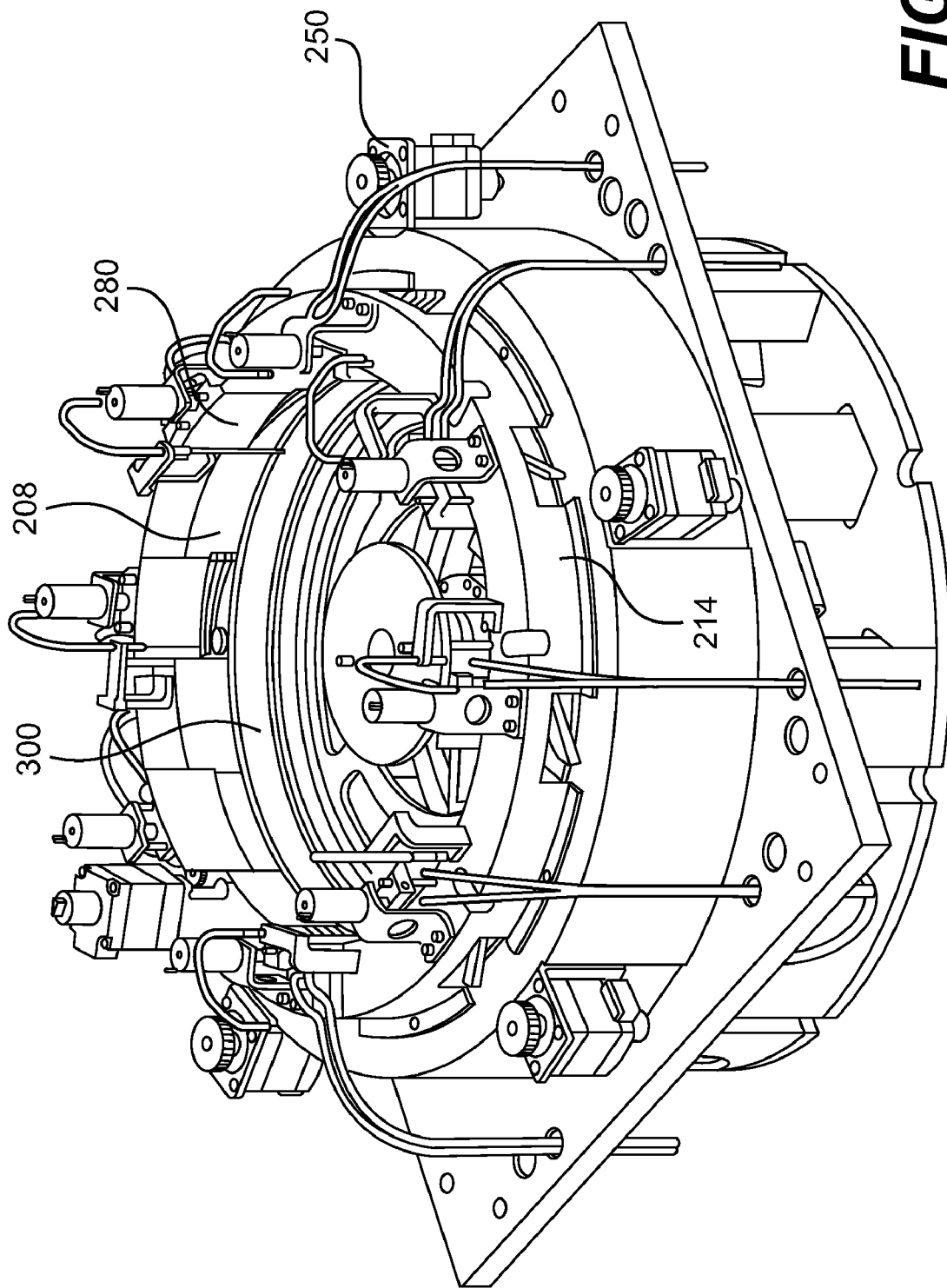
FIG. 4 is a perspective view of a portion of the singulating mechanism of FIG. 2.

Referring now to FIGS. 2-4, perspective views of portions of the singulating mechanism 200 of the singulating apparatus are illustrated, in accordance with embodiments of the present invention. FIG. 3 illustrates the singulating mechanism of FIG. 2 with its protective outer housing removed to reveal the positioning rings (discussed in detail below). FIG. 4 illustrates the singulating mechanism of FIG. 2 with its rotating floor removed to reveal the gates and blocking ring (discussed in detail below). As discussed above, the singulating mechanism 200 is housed in the upper housing of the singulating apparatus. When pills to be singulated are poured through the opening 116 in the upper housing, the pills enter the singulating chamber 202 of the singulating mechanism 200. The singulating mechanism 200 comprises a rotating floor 204, a separator wall 208 (seen in FIG. 4), an aperture control wall 206, a plurality of singulating cavities 210 (perhaps best seen in FIG. 5), and a plurality of conveying conduits 212. The rotating floor and the separator and aperture control walls together form the substantially cylindrical singulating chamber 202.

The rotating floor 204 has a top surface that is at least partially sloped downward from the center of the rotating floor toward the outer edge of the rotating floor. The centrifugal force created by the rotation of the floor drives pills in the chamber outward toward the separator and aperture control walls and therefore into the singulating cavities. The sloped area 232 (which is perhaps best seen in FIG. 7), which helps keep pills from the center of the floor where the centrifugal force is relatively weaker, does not extend all the way to the outer perimeter of the floor such that the much of the floor surface is flat. A raised hub 230 may be positioned in the center of the floor to prevent pills from accumulating in the center of the floor and to further help direct pills toward the singulating cavities.

The illustrated apparatus has seven singulating cavities (to facilitate singulating pills for one row of a 7 by 5 blister card in a single operation), however the number of singulating cavities may vary and may be any number based on user preferences.

The separator wall is substantially perpendicular to the rotating floor and adjacent an outer edge of the rotating floor. The separator wall defines a plurality of openings 208a. Each of the plurality of singulating cavities are adjacent an opening in the separator wall. Each singulating cavity is configured for receiving an object that travels from the rotating floor through a corresponding opening in the separator wall. In one embodiment of the invention, the separator wall and the singulating cavities are both formed from a single block of solid metal (e.g., aluminum) that is milled into a ring 214 (seen in FIG. 10), with the separator wall being defined by the inside surface of the ring and the singulating cavities being milled out of the bottom of the ring and extending through the ring from the inside surface to the outside surface.

The aperture control wall 206 is interiorly concentric with the separator wall and defines a plurality of openings 206a that each correspond to a respective opening of the separator wall. The aperture control wall is configured to rotate clockwise and counterclockwise and further configured to move longitudinally in either longitudinal direction (i.e., up or down). Movement of the aperture control wall relative to the separator wall changes an amount of overlap between each opening of the aperture control wall and each corresponding opening of the separator wall, such that the amount of overlap determines an effective opening for a pill to travel from the rotating floor into the singulating cavity. The amount of overlap (and therefore the size of the effective opening) is configured based on a size and shape of the pills to be singulated. The amount of overlap is determined by the amount and direction of rotation and/or the amount and direction of longitudinal movement. Rotational and longitudinal movement of the aperture control wall may be accomplished by any conventional means.

As discussed above, a singulating apparatus may have difficulty singulating pills having different sizes, different shapes, or both. Embodiments of the invention overcome this difficulty by providing a mechanism by which the internal size and shape of the singulating cavities can be varied to better correspond to the size and shape of the type of pill to be singulated. Having better correspondence between the internal size and shape of the singulating cavities and the size and shape of the type of pill to be singulated reduces the likelihood of there being more than one pill in any singulating cavity at any one time, thereby greatly reducing singulation errors.

Figure 5:
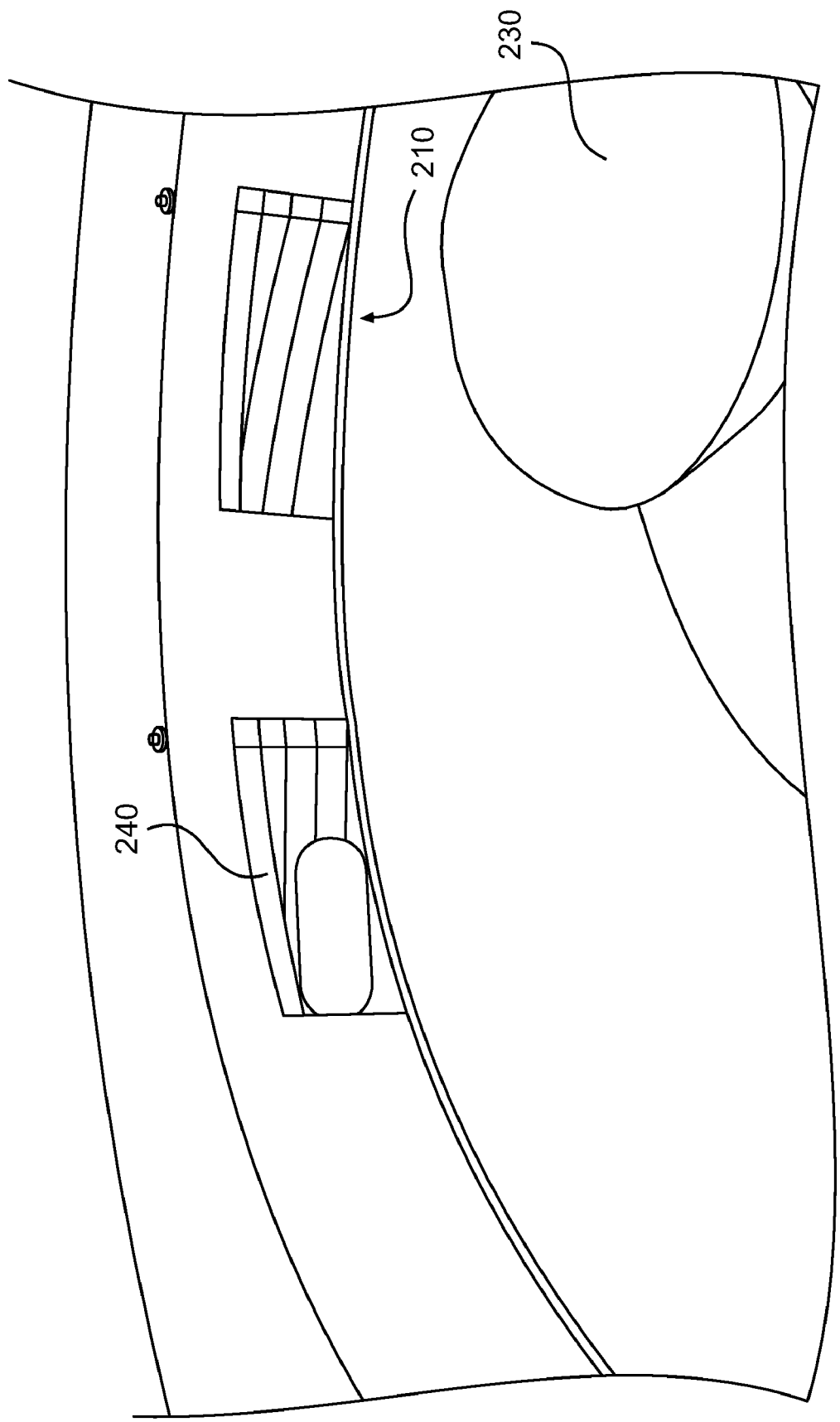
FIGS. 5 and 6 illustrate the operation of configuring the size and shape of the singulating cavities, using a plurality of wall segments, of the singulating mechanism of FIG. 2.
Figure 6:
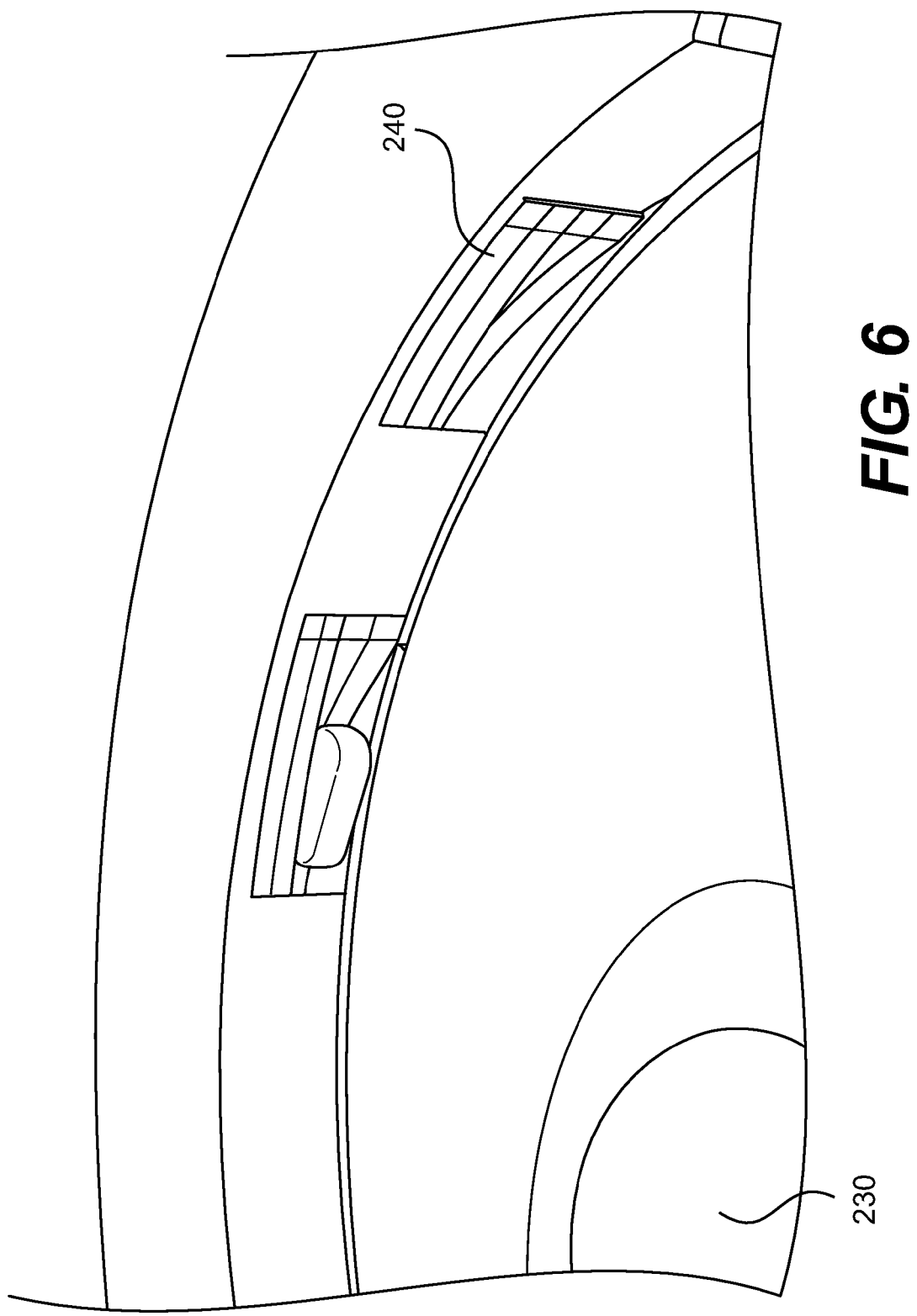
Figure 7:
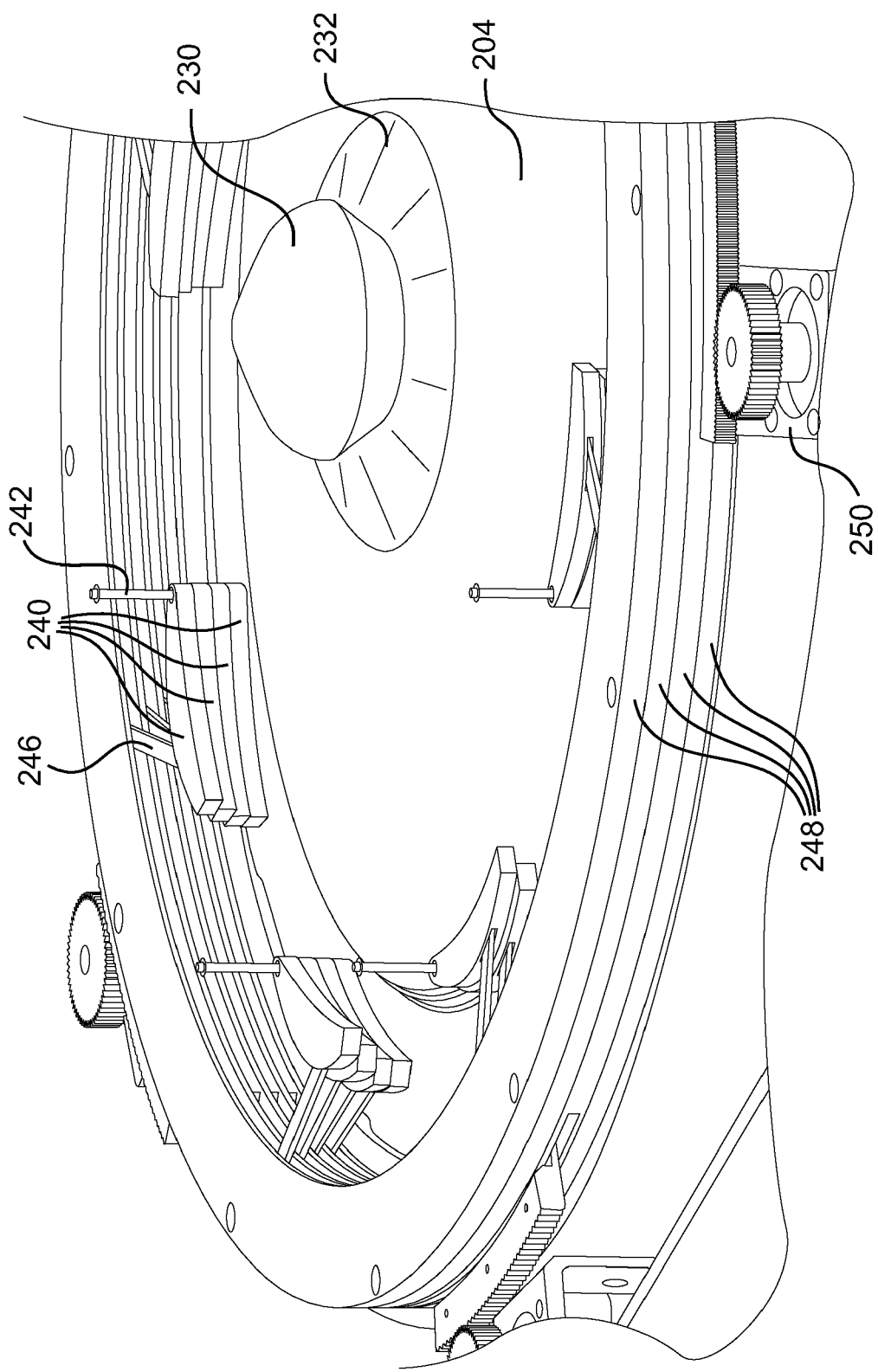
FIG. 7 illustrate the structure for controlling the plurality of wall segments of the singulating mechanism of FIG. 2.

Referring now to FIGS. 5-7, the operation of configuring the size and shape of the singulating cavities using a plurality of movable wall segments is illustrated. Each singulating cavity comprises a plurality of independently movable wall segments 240 that configured for adjustably defining a shape of the singulating cavity. The plurality of wall segments of each singulating cavity is in a stacked configuration and pivot independently about a common axis 242 through a proximal end of each wall segment. Each of the plurality of wall segments of each singulating cavity may be configured to independently pivot from a fully open position to a fully closed position, and to any of a plurality of positions between the fully open position and the fully closed position. By independently pivoting each of the plurality of wall segments of each singulating cavity to predetermined positions, the size and shape of the cavity can be configured. The predetermined position for each wall segment is predetermined based on a size and shape of the type of pills to be singulated. For example, FIG. 5 illustrates a situation in which the top wall segment of each of the two illustrated singulating cavities is in the fully closed position and the other three wall segments are in a somewhat open position. Such positioning of the wall segments may work well for the round capsule illustrated. In contrast, FIG. 6 illustrates a situation in which the top two wall segments of each of the two illustrated singulating cavities is in the fully closed position and the other two wall segments are in a somewhat open position. Such positioning of the wall segments may work well for the flattened caplet illustrated. While FIGS. 5 and 6 illustrate examples in which the open wall segments are all open to the same position, it should be appreciated that the open wall segments may be open to different positions, thereby creating a sloped wall (albeit with a stair-step surface) which may better correspond to the shape of the pills. While FIGS. 5-7 illustrate the use of four wall segments for each singulating cavity, a greater or lesser number of wall segments may be used in alternative embodiments of the invention.

Figure 8:
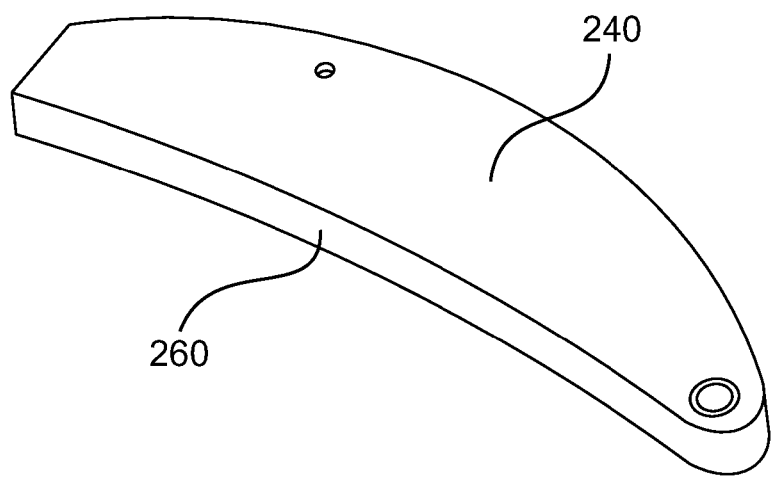
FIGS. 8 and 9 are front and rear perspective views of one of the plurality of wall segments of the singulating mechanism of FIG. 2.
Figure 9:
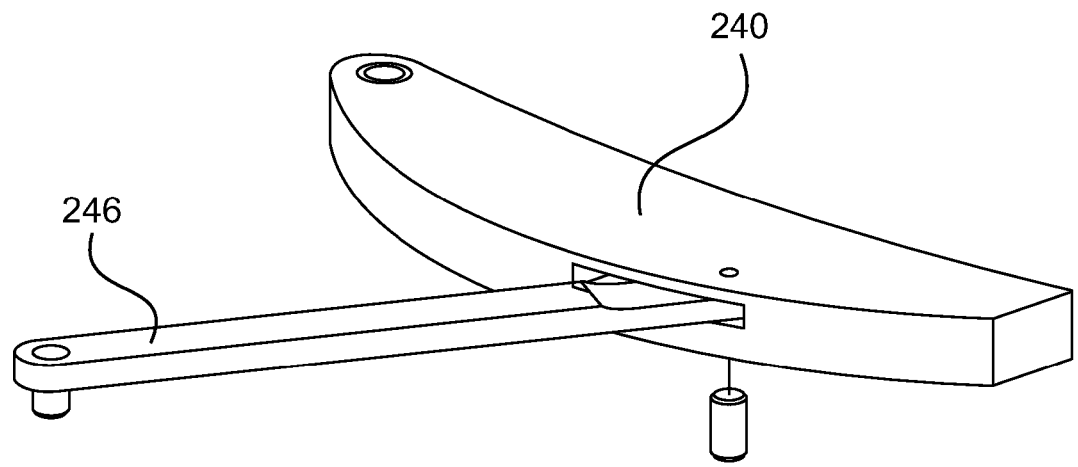

Referring now to FIGS. 8 and 9, front and rear perspective views of one of the plurality of wall segments of the singulating mechanism are illustrated in accordance with embodiments of the present invention. The wall segment of FIGS. 8 and 9 has a curved face 260 that has substantially the same curvature as the separator wall. This causes the curved face of each wall segment to be substantially aligned with the separator wall when the wall segment is in the fully closed position. If all wall segments are in the closed position, the singulating cavities are completely closed and no pills can enter the cavities.

Referring back to FIG. 7, the apparatus further comprises a plurality of wall segment positioning rings 248 exteriorly concentric with the separator wall. Each wall segment 240 is connected to a respective positioning ring via a connecting rod 246. Each connecting rod is pivotally affixed to its corresponding wall segment as illustrated in FIG. 9 and pivotally affixed to its corresponding positioning ring. Each wall segment positioning rings is configured to separately rotate clockwise or counterclockwise. A plurality of drive motors 250 rotate the positioning rings, each drive motor configured for rotating a corresponding positioning ring. Any suitable mechanical linkage between the motors and their corresponding positioning rings may be used, such as the gear-to-gear direct ring drive arrangement shown in FIG. 7. Any suitable positioning motor may be used, such as a stepper or servo motor.

As a positioning ring rotates, it changes the position of all of the wall segments that are connected to that positioning ring. Each wall segment for a particular singulating cavity is connected to and has its position controlled by a separate positioning ring, thereby enabling the independent movement of each wall segment for a particular singulating cavity. In FIG. 7, there are four positioning rings. The bottom positioning ring controls the bottom wall segments in all of the singulating cavities; the second from the bottom positioning ring controls the second from the bottom wall segments in all of the singulating cavities; the second from the top positioning ring controls the second from the top wall segments in all of the singulating cavities; and the top positioning ring controls the top wall segments in all of the singulating cavities. In other words, all of the bottom wall segments in all of the singulating cavities are controlled together, all of the second from the bottom wall segments in all of the singulating cavities are controlled together, all of the third from the bottom wall segments in all of the singulating cavities are controlled together, and all of the top wall segments in all of the singulating cavities are controlled together, With this arrangement, the determined wall segment configuration is identical for all singulating cavities.

Figure 10:
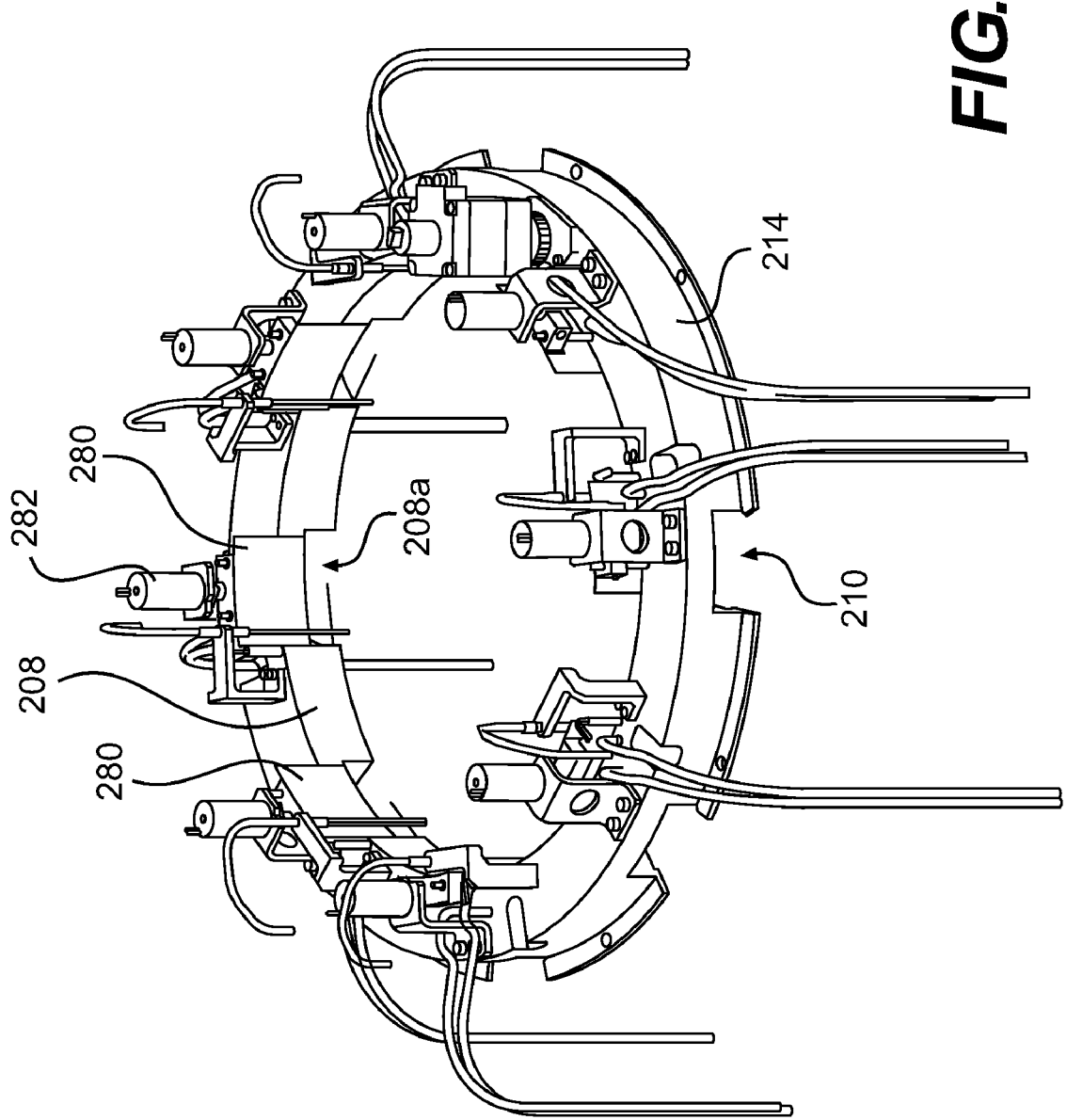
FIG. 10 is a perspective view of a portion of the singulating mechanism of FIG. 2.

The singulating apparatus 200 comprises a plurality of gates 280 (best seen in FIG. 10). Each gate corresponding to an opening of the separator wall and to a singulating cavity and is configured to alternatively block the corresponding opening of the separator wall or allow access to the corresponding opening of the separator wall, thereby controlling whether or not a pill can enter a particular corresponding singulating cavity. In the illustrated embodiment, the plurality of gates are configured to move longitudinally from an open position (thereby allowing access to the corresponding cavity) to a closed position (thereby blocking the corresponding cavity). Any suitable mechanism, such as pneumatic actuator 282, may be used to move the gates. Each of the gates can be separately controlled, such that any number and combination of gates can be open or closed at any particular time. Such independent control of the singulating cavity gates facilitates non-uniform filling of the blister card recesses, such as for every other day or every third day dosing. In the illustrated embodiments, the gates are positioned between the separator wall and the aperture control wall.

Referring back to FIG. 4, the singulating mechanism further comprises a blocking ring 300 interiorly concentric with the separator wall and between the separator wall and the rotating floor. The blocking ring may be configured to move longitudinally in either longitudinal direction (i.e., up and down) from an open position to a closed position. In the closed (i.e., up) position, the blocking ring blocks all openings of the separator wall thereby preventing any pills from entering any of the singulating cavities. In the open (i.e., down) position, the blocking ring allows access to all openings of the separator wall thereby allowing pills to enter any of the singulating cavities (unless, of course, any of the cavities are blocked by a closed gate). The blocking ring is typically constructed of a somewhat flexible material to reduce the likelihood of pill damage as the blocking ring is raised.

Figure 11:
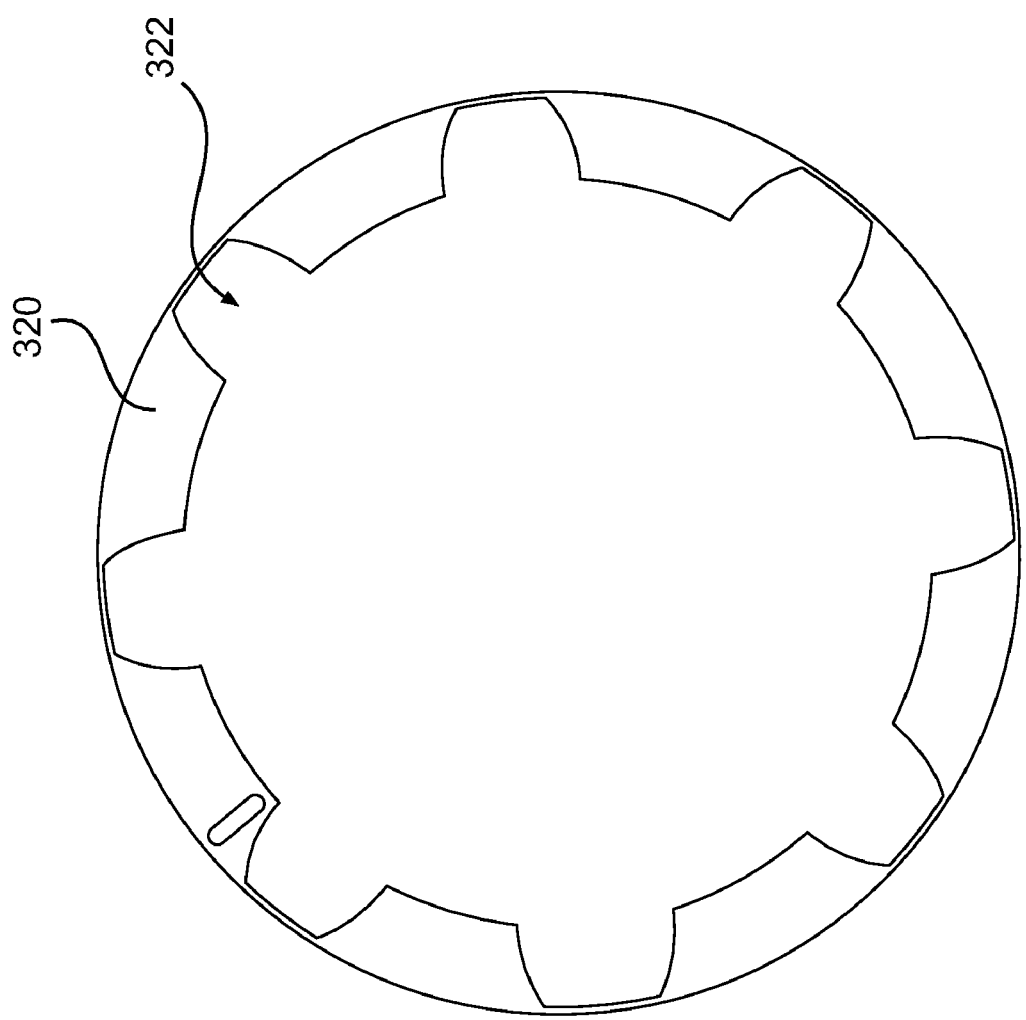
FIG. 11 is a top view of a release ring of the singulating mechanism of FIG. 2.

Referring now to FIG. 11, the singulating mechanism further comprises a release ring 320 exteriorly concentric with and substantially perpendicular to the separator wall and positioned below the singulating cavities. The release ring essentially forms the "floor" of the singulating cavities (at least when in the closed position, as discussed below). The release ring defines a plurality of openings 322, one for each of the singulating cavities. The release ring is configured to rotate between an open position and a closed position. When the release ring is in the closed position, the openings in the floor ring do not align with the corresponding singulating cavities, thereby retaining pills in the singulating cavities. When the release ring is in the open position, the openings in the floor ring align with the corresponding singulating cavities, thereby causing pills in the singulating cavities to drop out of the singulating cavities. A compressed air jet may be used help propel the pills out of the singulating cavities and into the conveying conduits when the release ring moves to the open position. Alternatively or additionally, the compressed air jet may be used to clean the cavities such as by expelling pill dust and/or fragments.

Referring back to FIG. 2, each of the plurality of conveying conduits 212 lead from the bottom of a respective singulating cavity to a position aligned above a blister card 108 held by the blister card positioning mechanism 106. Each conveying conduit is configured for conveying a pill from a corresponding one of the singulating cavities to a corresponding receiving container (such as one of the recesses in the blister card 108).

After the singulating process is completed for a particular pill type, there will likely be excess pills remaining in the singulating chamber. These excess pills need to be returned to the original bulk pill container (typically to be returned to its stocking location until needed again). To facilitate this, the separator wall may define a purge opening (in addition to the openings for the singulating cavities). Further, the singulating mechanism may further comprise a purge conduit for conveying pills from the purge opening to the bulk pill container. The singulating mechanism may also comprise a gate (similar to the gates for the singulating cavities) configured to alternatively block the purge opening or allow access to the purge opening. In operation, the excess pills will be purged from the singulating chamber by closing all of the gates for the singulating cavities and opening the gate for the purge opening while continuing to rotate the floor. The rotating floor will cause the excess pills to enter the purge opening and from there will gravity feed (possibly with a compressed air assist) into the purge conduit and into the bulk pill container. The lower (i.e., dispensing) end of the purge conduit may protrude from the housing of the singulating apparatus, and a bulk container holding mechanism may be provided which holds the bulk container under the lower end of the purge conduit as the excess pills are being purged.

A number of different sensors are used to ensure proper operation of the apparatus. There are typically sensors in each singulating cavity to determine the presence of a pill in the cavities. There are typically sensors at the openings in the separator wall to determine if any pills are partially protruding from the opening. There are typically sensors at the lower ends of the pill conveying conduits to determine if a pill exits a conduit when expected. There may be a sensor to detect if a bulk pill container is present. There may be a sensor at the lower ends of the purge conduit to determine if pills are exiting the conduit. Other sensors may be used as necessary. Any suitable sensors may be used.

Figure 12:
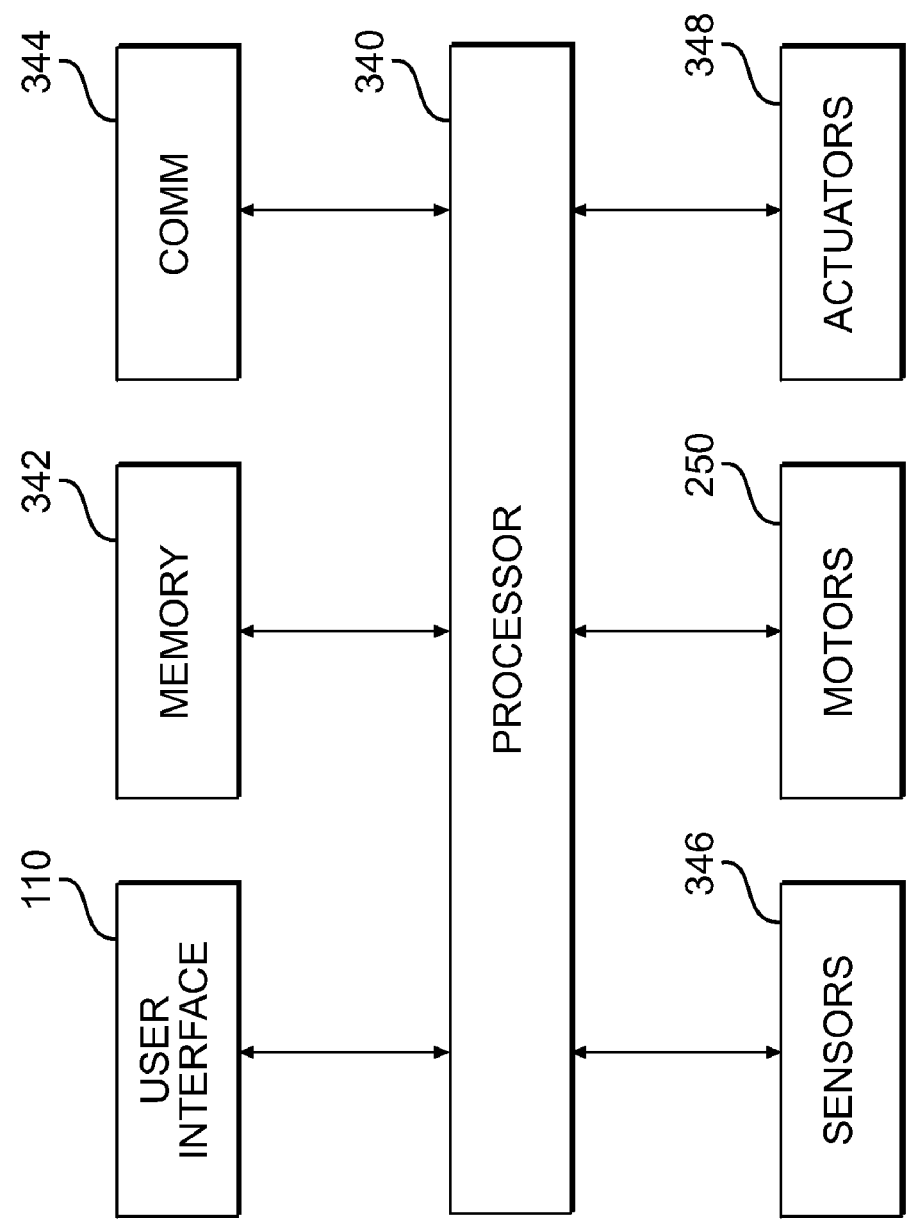
FIG. 12 is a block diagram of a control system of the singulating apparatus of FIG. 1.

Referring now to FIG. 12, a block diagram of a control system of the singulating apparatus is illustrated. The apparatus is controlled by a controller 340. The controller may be comprised of a microprocessor, dedicated or general purpose circuitry (such as an application-specific integrated circuit or a field-programmable gate array), a suitably programmed computing device, or any other suitable means for controlling the operation of the device. The controller implements software instruction code stored in memory 342. Additionally, data used in the implementation of the software code is stored in memory 342. A communication element 344 enables the controller to receive, for example, new or updated software code and new or updated medication and/or patient data. Additionally, the controller may use the communication element to send data, such as error codes or other maintenance information. The controller of the singulating apparatus may also use the communication element to communicate with a separate computing device, such as a pharmacy computer (either locally or remotely over a network) to obtain patient and/or medication information. The communication element may use any suitable communication protocol and means, wired or wireless, and may communicate over any suitable network (e.g., LAN, WAN, WiFi, WiMax, Internet, etc.). The controller receives user inputs from the user interface 110, and sends information to the user interface for display to the user. The controller receives signals from a plurality of sensors 346, and controls motors 250 and actuators 348 in accordance with the software code.

Figure 13:
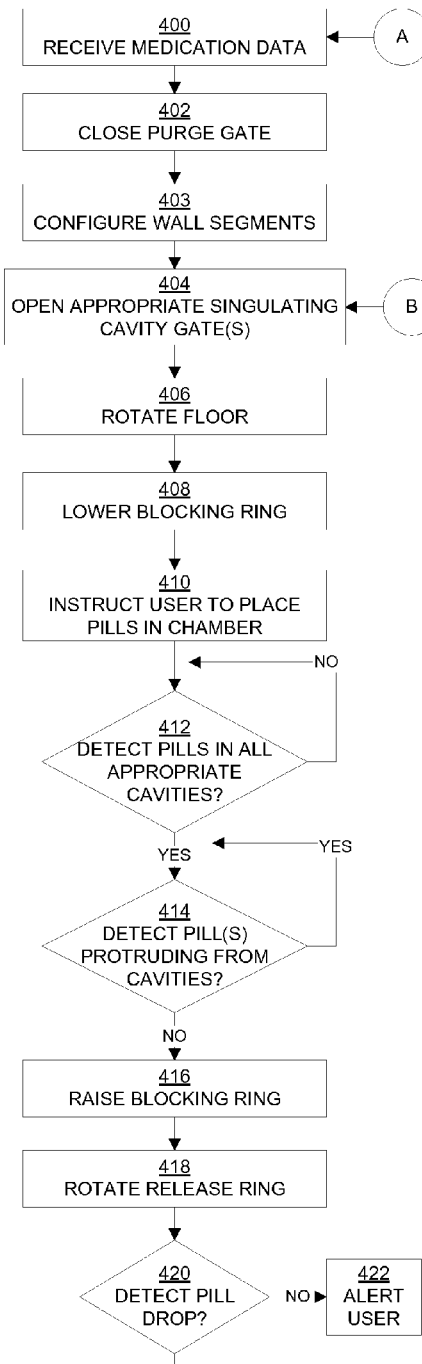
FIG. 13 is a flowchart of the operation of a singulating apparatus, in accordance with embodiments of the present invention.
Figure 13:
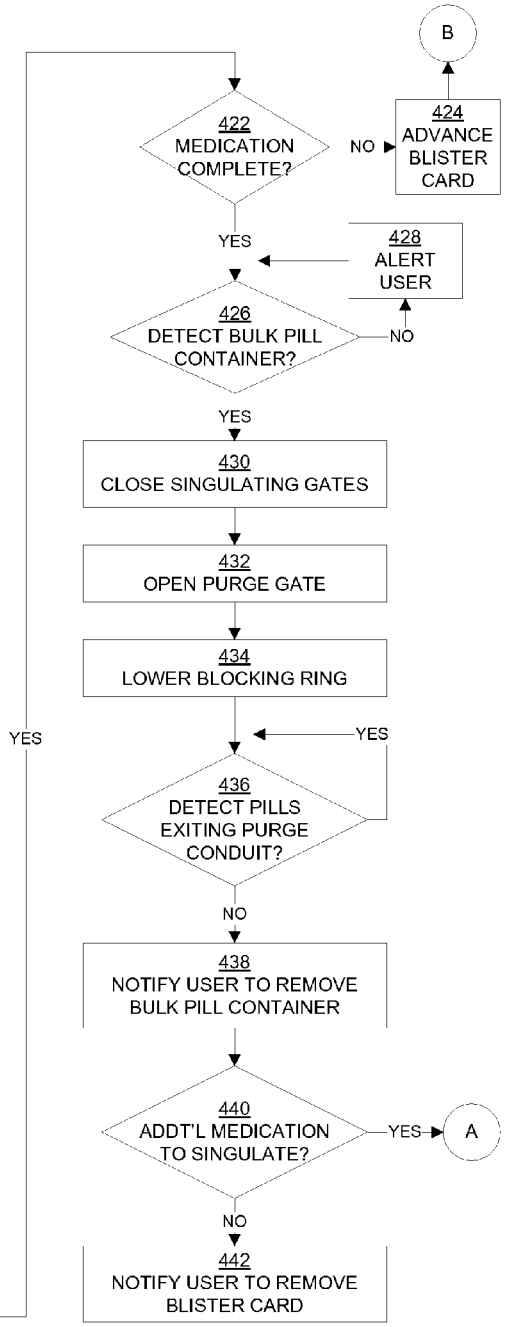

Referring now to FIG. 13, the operation of a singulating apparatus of embodiments of the invention will now be described. It should be appreciate that the operation described herein is illustrative only and not intended to be limiting. In a typical operation in which a user wants to singulate one or more types of pills into a blister card for a specific patient, the user (typically a pharmacist or pharmacy technician) will specify the patient such as by inputting a patient name or identification number (such entry may be via a keypad, a touch screen, a bar code reader, and/or a magnetic card reader). The apparatus may obtain the patient's medication/dosing schedule information, either from memory 342 or from a separate computing device. Alternatively, the user may input the medication/dosing schedule information manually. The process illustrated in FIG. 13 begins when the medication/dosing schedule information is received (block 400) by the apparatus. The purge gate is closed (if necessary) (block 402), the wall segments are configured for the singulating cavities (block 403), and the appropriate gates controlling access to the singulating cavities are opened (block 404). The configuration of the wall segments (i.e., the position of each wall segment) is typically determined based on the specific type of pill to be singulated (this configuration is discussed in more detail below). Which gates are open will vary depending on the specific dosing instruction. The floor is rotated (block 406). The speed of rotation of the rotating floor will typically be variable and will be predetermined based on properties (e.g., mass) of the type of pill to be singulated. The speed of rotation of the rotating floor may also be based on the coefficient of friction of the type of pill to be singulated and/or the coefficient of friction of the surface of the rotating floor.

The blocking ring is lowered (block 408) (if necessary) to enable access to all singulating cavities. The user is instructed (via the user interface) to pour a supply of the pills to be singulated from a bulk pill container into the singulating chamber via the opening in the top of the upper housing of the apparatus. The user may at this point also be instructed to place the bulk pill container onto the bulk pill container holding mechanism for later use in the purge operation. The rotating floor will cause pills to enter the singulating cavities. If all of the appropriate cavities have pills in them (block 412) and none of the cavities have pills protruding from them (block 414), the blocking ring is raised (block 416) to prevent any pills from entering or leaving the cavities. As seen at block 414, the blocking ring will not be raised if any pills are protruding from any cavities, as the rotation of the floor and movement of other pills in the chamber will likely dislodge any protruding pills.

The release ring is then rotated (block 418) to cause the pills in the cavities to drop out of the cavities and into the pill conveying conduits. Compressed air jets may also be activated to help propel the pills out of the cavities. Sensors (typically at the lower ends of the conduits) detect if the pills that were in the cavities have exited properly (block 420). If not, the user is notified to correct the situation (block 422).

If the pills are detected to have properly exited the cavities, it is determined if the singulation of the current medication is complete (i.e., have all appropriate recesses of the blister card been filled with the current medication) (block 422). If not, the blister card is advanced to the next row (block 424) and the process returns to block 404. If the singulation of the current medication is complete, it is determined if a bulk pill container is on the bulk pill container holding mechanism (block 426) such that the excess pills can be purged. If not, the user is notified to place the bulk pill container on the bulk pill container holding mechanism (block 428).

If the bulk pill container is detected to be on the bulk pill container holding mechanism, the purge process begins. The singulating cavity gates are closed (block 430), and the purge cavity gate is opened (block 432). The blocking ring is lowered (if necessary) (block 434). The rotating floor will cause pills to enter the purge cavity and into the purge conduit. A compressed air jet may also be activated to help propel the pills through the purge conduit. A sensor detects the pills as they are exiting the purge conduit (block 436). Once it is determined that pills are no longer exiting the purge conduit (based on, for example, whether a predetermined amount of time has lapsed since a pill was last detected), the user is notified to remove the bulk pill container (block 438). It is then determined if any additional medications need to be singulated into the current blister card (block 440). If so, the process returns to block 400. If not, the user is notified to remove the blister card from the apparatus (block 442) and the singulating operation is complete.

As discussed above, the configuration of the wall segments (i.e., the position of each wall segment) is typically determined based on the specific type of pill to be singulated. In a typical operation, a user specifies which specific type of pill that is to be singulated. The user may specify the type of pill using any one of several different methods, in accordance with alternative embodiments of the invention. For example, the user may input via the user interface a patient identifier (e.g., name, ID number, etc.) into the apparatus (such as by typing the patient's name or keying in the patient's ID number). The apparatus may then retrieve from memory (local or remote) a list of the patient's medications, and the user may select the appropriate medication. Alternatively, the user may directly input via the user interface the specific type of pill (without reference to a specific patient) into the apparatus (such as by typing the medication identifying information, keying in a stock number or other identifying number, or scanning a bar code on the medication). The medication identifying information typically includes the brand and/or generic name, the manufacturer's name, the amount of medication per pill (i.e., the dosage). The user interface will typically be linked to a medication database stored in memory (local or remote), which enables search capabilities to assist the user to specify the medication. For example, the user interface may include a feature that narrows the selection as the user inputs each successive letter in the medication name. Additionally, once a medication name is selected, the available dosage(s) for that medication may be displayed such that the user need only select the appropriate dosage. Further, if the selected medication is generic, it may be necessary to select the manufacturer's name as the pill size and shape may vary based on the manufacturer. Thus, once a medication name is selected, the available manufacturer(s) for that medication may be displayed such that the user need only select the appropriate manufacturer.

A portion of an example medication database in shown in Table 1. In this example, the database includes the brand name (if appropriate), the generic name, the manufacturer, and the available dosages. Importantly, the database also includes the information for configuring the movable wall segments to configure the size and shape of the singulating cavities for each specific medication.

TABLE 1

| Brand Name | Generic Name | Manuf. | Dose | Segment 1 | Segment 2 | Segment 3 | Segment 4 |
|---|---|---|---|---|---|---|---|
| Lanoxin | Digoxin | Glaxo | 0.125 mg | 15 | 15 | 20 | 20 |
| Lanoxin | Digoxin | Glaxo | 0.250 mg | 12 | 12 | 20 | 20 |
| n/a | Digoxin | Barr | 0.125 mg | 15 | 15 | 20 | 20 |
| n/a | Digoxin | Barr | 0.250 mg | 12 | 12 | 20 | 20 |

In the above-described embodiment of the singulating apparatus, each singulating cavity has four independently movable wall segments that configure the size and shape of the cavities. As shown in Table 1, position information for each of the four wall segments is provided. This position information may be provided in many different ways, and the method illustrated in Table 1 is not intended to be limiting. In an embodiment in which the wall segment positions are controlled by movement of positioning rings which are in turn controlled by stepper motors, the wall segment position may be specified by specifying the number of motor steps to reach the desired position. For example, zero steps may be a fully open position, while twenty steps may be a fully closed position, and steps between zero and twenty specify differing positions between fully open and fully closed.

Once all of the required medication information is selected, the wall segment configuration information is retrieved from the database. This configuration information is used by the processor to control the stepper motors (in this example) to move the wall segments to the desired positions.

The medication database may also contain photographs (or links to photographs) of specific medications, such that a photograph of the selected medication may be displayed to the user for verification purposes.

The flowchart and block diagrams in the figures illustrate the architecture, functionality, and operation of possible implementations of apparatus and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

"Computer" or "computing device" broadly refers to any kind of device which receives input data, processes that data through computer instructions in a program, and generates output data. Such computer can be a hand-held device, laptop or notebook computer, desktop computer, minicomputer, mainframe, server, cell phone, personal digital assistant, other device, or any combination thereof.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

That which is claimed:

1. An apparatus for singulating objects, the apparatus comprising:
    a rotating floor;
    a separator wall substantially perpendicular to the rotating floor and adjacent an outer edge of the rotating floor, thereby forming a substantially cylindrical chamber, the separator wall defining a plurality of openings;
    a plurality of singulating cavities, each singulating cavity adjacent an opening in the separator wall, each singulating cavity configured for receiving an object that travels from the rotating floor through a corresponding opening in the separator wall, each singulating cavity comprising a plurality of independently movable wall segments configured for adjustably defining a shape of the singulating cavity, wherein the plurality of wall segments of each singulating cavity are in a stacked configuration, wherein each of the plurality of wall segments of each singulating cavity pivots independently about a common axis through a proximal end of each wall segment; and
    a plurality of conveying conduits, each conveying conduit configured for conveying an object from a corresponding one of the singulating cavities to a corresponding receiving container.

2. The apparatus of claim 1, wherein each of the plurality of wall segments of each singulating cavity is configured to independently pivot from a fully open position to a fully closed position, and wherein each of the plurality of wall segments of each singulating cavity is configured to independently pivot to any of a plurality of positions between the fully open position and the fully closed position.

3. The apparatus of claim 2, wherein each of the plurality of wall segments of each singulating cavity has a curved face having substantially the same curvature as the separator wall, and wherein the curved face of each wall segment is substantially aligned with the separator wall when the wall segment is in the fully closed position.

4. The apparatus of claim 2, wherein the plurality of wall segments of a specific singulating cavity define a desired shape of the singulating cavity by independently pivoting each of the wall segments to a predetermined position, and wherein the positions are predetermined based on a size and shape of a type of object to be singulated.

5. The apparatus of claim 1, further comprising:
    an aperture control wall that is interiorly concentric with the separator wall, the aperture control wall defining a plurality of openings, each opening of the aperture control wall corresponding to an opening of the separator wall, wherein a movement of the aperture control wall relative to the separator wall changes an amount of overlap between each opening of the aperture control wall and each corresponding opening of the separator wall, wherein the amount of overlap determines an effective opening for an object to travel from the rotating floor into the singulating cavity, and wherein the amount of overlap is configured based on a size and shape of a type of object to be singulated.

6. The apparatus of claim 5, wherein the aperture control wall is configured to rotate clockwise and counterclockwise and further configured to move longitudinally in either longitudinal direction, and wherein the amount of overlap is determined by an amount and direction of rotation and an amount and direction of longitudinal movement.

7. The apparatus of claim 1, wherein the rotating floor has a top surface that is sloped downward from a center of the rotating floor toward the outer edge of the rotating floor.

8. The apparatus of claim 4, further comprising:
    a plurality of wall segment positioning rings exteriorly concentric with the separator wall, each wall segment positioning rings configured to separately rotate clockwise or counterclockwise, each one of the wall segment positioning rings cooperating with and thereby controlling a position of corresponding ones of the wall segments of each singulating cavity.

9. The apparatus of claim 8, further comprising:
    a plurality of connecting rods, each connecting rod connecting a wall segment to a corresponding one of the wall segment positioning rings, each connecting rod pivotally affixed to a corresponding wall segment at a location distal to the proximal end.

10. The apparatus of claim 8, further comprising:
    a plurality of drive motors, each drive motor configured for rotating a corresponding one of the wall segment positioning rings and thereby moving corresponding ones of the wall segments to the predetermined positions.

11. The apparatus of claim 1, further comprising:
    a plurality of gates, each gate corresponding to an opening of the separator wall, each gate configured to alternatively block the corresponding opening of the separator wall or allow access to the corresponding opening of the separator wall.

12. The apparatus of claim 11, wherein each of the plurality of gates is configured to move longitudinally from an open position to a closed position, wherein each gate blocks the corresponding opening of the separator wall when in the closed position and allows access to the corresponding opening of the separator wall when in the open position.

13. The apparatus of claim 1, further comprising:
a blocking ring interiorly concentric with the separator wall and between the separator wall and the rotating floor, the blocking ring configured to move longitudinally in either longitudinal direction from an open position to a closed position, wherein the blocking ring blocks all openings of the separator wall when in the closed position and allows access to all openings of the separator wall when in the open position.

14. The apparatus of claim 1, further comprising:
a release ring exteriorly concentric with and substantially perpendicular to the separator wall and positioned below the singulating cavities, the release ring defining a plurality of openings, each opening in the release ring corresponding to one of the singulating cavities, the release ring configured to rotate between an open position and a closed position;
wherein, when the release ring is in the closed position, the openings in the floor ring do not align with the corresponding singulating cavities, thereby blocking objects in the singulating cavities from dropping out of the singulating cavities, and
wherein, when the release ring is in the open position, the openings in the floor ring align with the corresponding singulating cavities, thereby enabling objects in the singulating cavities drop out of the singulating cavities.

15. The apparatus of claim 11, wherein the separator wall further defines a purge opening, and wherein one of the plurality of gates corresponds to the purge opening and is configured to alternatively block the purge opening of the separator wall or allow access to the purge opening of the separator wall; and wherein the apparatus further comprises:
a purge conduit for conveying objects from the purge opening to a bulk receiving container.

\* \* \* \* \*